(12) United States Patent
Cosham et al.

(10) Patent No.: US 9,729,614 B2
(45) Date of Patent: Aug. 8, 2017

(54) RESILIENT DATA NODE FOR IMPROVING DISTRIBUTED DATA MANAGEMENT AND BANDWIDTH UTILIZATION

(71) Applicant: Datacastle Corporation, Seattle, WA (US)

(72) Inventors: Jane Cosham, Redmond, WA (US);
Gary Sumner, Redmond, WA (US);
Alex Laskos, Redmond, WA (US);
Mark Reynoldson, Fitzroy North (AU)

(73) Assignee: Datacastle Corporation, Seattle, WA (US)

( * ) Notice: Subject to any disclaimer, the term of this patent is extended or adjusted under 35 U.S.C. 154(b) by 867 days.

(21) Appl. No.: 14/043,572

(22) Filed: Oct. 1, 2013

(65) Prior Publication Data
US 2014/0101223 A1    Apr. 10, 2014

Related U.S. Application Data

(60) Provisional application No. 61/708,380, filed on Oct. 1, 2012.

(51) Int. Cl.
*H04L 29/08*    (2006.01)
*G06F 11/14*    (2006.01)

(52) U.S. Cl.
CPC .......... *H04L 67/10* (2013.01); *G06F 11/1464* (2013.01); *H04L 67/02* (2013.01); *H04L 67/1097* (2013.01); *H04L 67/2842* (2013.01)

(58) Field of Classification Search
CPC ...................................................... H04L 67/10
See application file for complete search history.

(56) References Cited

U.S. PATENT DOCUMENTS

| 6,324,685 | B1* | 11/2001 | Balassanian | G06F 9/445 717/118 |
| 8,868,724 | B2* | 10/2014 | Goodwin | G06F 9/455 709/219 |
| 2007/0203957 | A1* | 8/2007 | Desai | G06F 21/31 |
| 2007/0220319 | A1* | 9/2007 | Desai | G06F 11/006 714/13 |
| 2010/0260187 | A1* | 10/2010 | Ongole | H04L 12/4641 370/395.53 |
| 2015/0012864 | A1* | 1/2015 | Goodwin | G06F 9/45558 715/771 |

OTHER PUBLICATIONS

Datacastle, "Enabling Technologies Secure Data Deduplication", Jun. 9, 2010.*
Datacastle, "Datacastle RED Benefits", Aug. 19, 2010.*
Datacastle, "Datacastle RED Webpage", Apr. 24, 2011.*
Datacastle, "Datacastle RED Modernize your Endpoint Backup", May 12, 2011.*

* cited by examiner

*Primary Examiner* — Jerry Dennison
(74) *Attorney, Agent, or Firm* — Olympic Patent Works PLLC

(57) ABSTRACT

The present document is directed to data backup and data archiving and data synching and data sharing over disparate networks for the purpose of allowing private and commercial computing device users to back up, archive, synchronize and share data, including data files, on remote data-storage facilities via a network-based application. In particular, the teachings of the present document facilitate the end to end process through the utilization of a resilient data node without compromising the system itself, or the data stored therein security or privacy.

8 Claims, 6 Drawing Sheets

RESILIENT DATA NODE FOR IMPROVING DISTRIBUTED DATA MANAGEMENT AND BANDWIDTH UTILIZATION

CROSS-REFERENCE TO RELATED APPLICATION

This application claims the benefit of Provisional Application No. 61/708,380, filed Oct. 1, 2012.

BACKGROUND OF THE INVENTION

With an ever-increasing number of computing devices attaching to networks, each with an ever-increasing data storage capacity, more and more data is being created and consumed at the edge of the network. While the direct network connectivity of these computing devices has been able to keep up from a bandwidth-requirement perspective based on the needs of a single computing device connection, shared connections, such as those within a home office or remote branch office of a company, have not.

In most corporate environments, data is critical to the needs of the organization, and historically there would a single computing device at the edge of the corporate network that was shared between multiple users. There was little, if any, local data storage and the network connectivity between these shared devices and the server-based systems to which they connected were more than adequate. Today's, and, increasingly, tomorrow's environment has totally flipped this model of computing on its head. Instead of a single computing device that is shared between multiple people, each person regularly has multiple personal computing devices each with its own large capacity of local data storage. In this new model, data is more often created and consumed at the edge of the network, with minimal operational oversight or control by centralized IT administration.

SUMMARY OF THE INVENTION

The present document is directed to data backup and data archiving and data synching and data sharing over disparate networks for the purpose of allowing private and commercial computing device users to back up, archive, synchronize and share data, including data files, on remote data-storage facilities via a network-based application. In particular, the teachings of the present document facilitate the end to end process through the utilization of a resilient data node without compromising the system itself, or the data stored therein security or privacy.

DETAILED DESCRIPTION OF THE INVENTION

Figure 1:
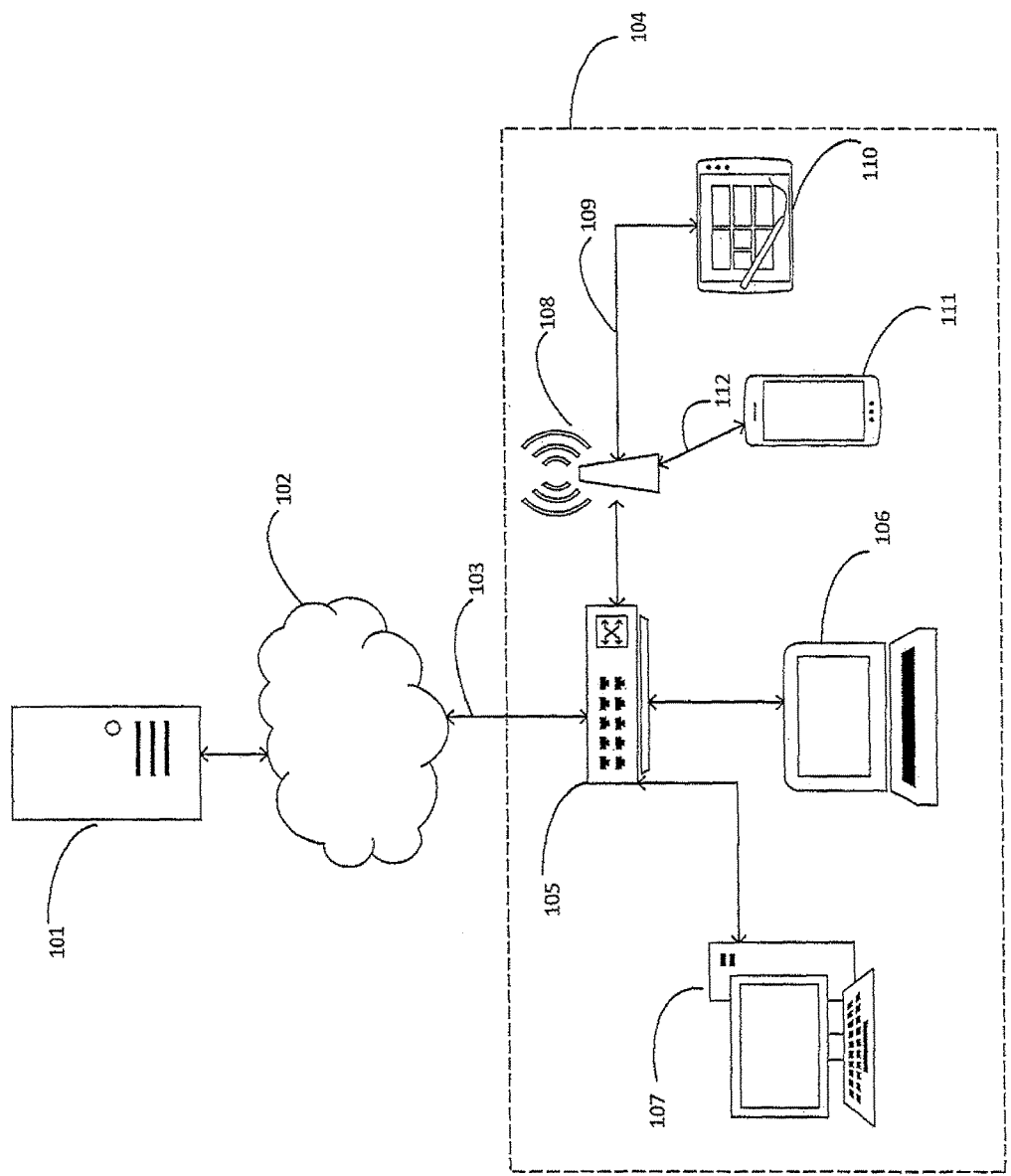
FIG. 1 illustrates a single network site that connects multiple computing devices through a shared WAN connection to application server used for the backup, archiving, synchronization and sharing of data.

In order to protect the data at the edge of the network, FIG. 1 illustrates a typical deployment of an overall system that encompasses an application server 101 providing a set of network-based application services for data backup and data archiving and data synchronization and data sharing that exposes its services over a network 102 (the networks in the enclosed Figures could represent the Internet or any other public and/or private network topology and configuration). A remote branch office site 104 usually contains a high-speed Ethernet local area network (LAN) switch 105 that connects via a low bandwidth network connection 103 to the wide area network (WAN) 102 at significantly slower speeds than it provides to the computing devices resident on the LAN switch 105. Agents are loaded on to each computing device such as a PC 107 or a laptop 106 and will consume the set of network-based application services exposed by the application server 101. Wireless devices, such as tablets 110 or smartphones 111, will connect to the LAN network via a wireless connection 109 to a Wireless Access Point 108 that in turn is connected to the LAN switch 105. Wireless devices could also connect to the network via mobile data access points using protocols such as 3G/4G/LTE/CDMA etc. but these are not shown in the diagram.

In such a configuration, the data traffic between the computing devices 107 106 110 and the application server 101 passes through the speed limited, shared low bandwidth connection 103. Even with a relatively small number of computing devices, the network connection 103 is easily swamped by the data traffic needing to pass back and forth. The teachings of the present document, illustrated in FIG. 2, solve this issue by implementing a resilient data node locally on the high speed LAN to cache the data on the LAN, while addressing the bandwidth utilization pressure on the low bandwidth network connection 103.

The resilient data node, in order to help address the IT administration burden of distributed data management, can be centrally managed through a single interface without the need to administer the resilient data node directly. Through this interface, you can do things such as:

Viewing status such as current speeds and queue lengths
Alerts for levels of disk space, queue length, queue age etc.
Managing bandwidth policy and the speeds to use at various times of the day
Controlling state, including taking the resilient data note offline for computing device use while still uploading, or taking offline and handling restores when blocks are only on an offline resilient data node.

As illustrated in FIG. 1, a remote network site 104 that needs to connect to Web-Service-based data backup and data archiving and data synchronization and data sharing functionality will quickly overwhelm a shared low bandwidth network connection 103. Agents that are loaded onto computing devices 107 and 106 are sending their data over this shared low bandwidth connection. The data that is sent between the agents and the network-based application service is categorized as either management metadata or the actual data itself and in most cases, the data itself represents much of the bandwidth that is consumed across the network connection.

Figure 2:
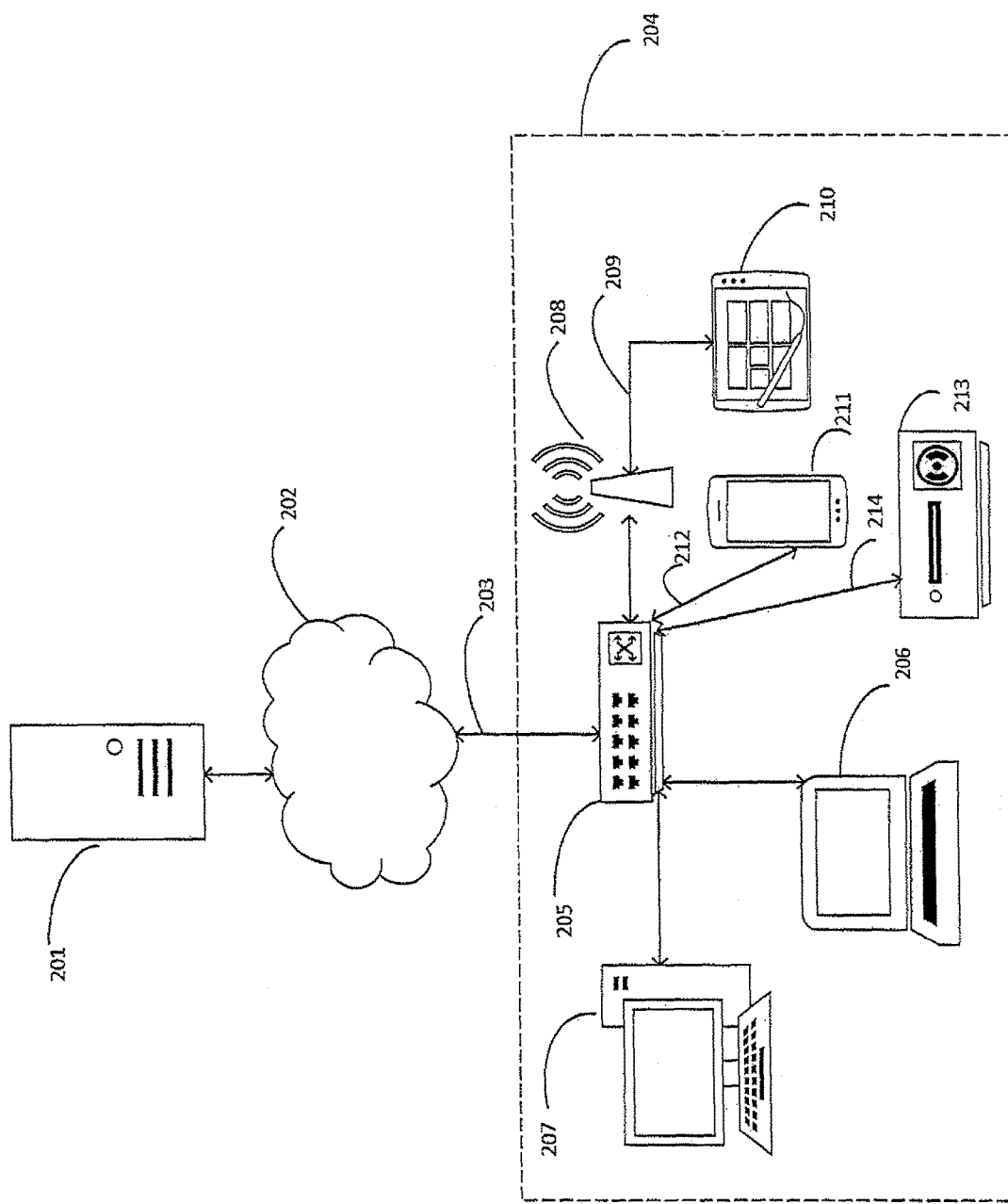
FIG. 2 illustrates a single network site that adds a single resilient data node onto the high speed LAN for the purposes of data caching and performing time shift bandwidth utilization of the shared WAN connection.

An example of a resilient data node is illustrated in FIG. 2, where a resilient data node 213 is added to the high speed LAN via the Ethernet switch 205. The resilient data node 213 exposes its functionality over Web-Service-based interface, providing a high-speed cache on the LAN 205 for data that needs to be sent to, or come from the application server 201.

An agent on the computing device 206 continues to communicate with the application server 201 and/or resilient data node 213 for its management metadata, however the actual data will now flow to the resilient data node 213 instead of directly to the application server 201. The connectivity between the computing devices 206 207 210 and the resilient data node 213 now travels over a high-speed LAN switch 205, so the movement of data to and from the computing devices 206 207 210 completes significantly faster. With the agents on the computing devices no longer utilizing the low bandwidth network connection 203 for its data transfer, a centralized policy that documents the aggregate bandwidth to use by time period can be applied to the resilient data node 213 for its use of the low bandwidth network connection 203 so no matter how many computing devices exist within the LAN site 204.

Computing devices now process their data locally and perform any client side data de-duplication based on its management metadata communication with the application server 201 and/or resilient data node 213. Any data flagged to be unique and requiring to be uploaded are sent via network-based application service protocols to the resilient data node 213 for later transport to the application server 201 based to the data transfer policy to the LAN site 204. Once the data has been uploaded to the resilient data node 213, it informs the application server 201 that it put the data on the resilient data node 213 and it is transferred at a later time. By enabling the management metadata to come from the resilient data node, advanced scenarios are enabled, including the ability to support the network site 204 after losing connectivity to the application server 201 by enabling data processing to continue offline, being brought back into synchronization once connectivity is restored. It also enables the resilient-data-node optimization.

This data can still be globally de-duplicated against even though it hasn't made it completely to the application server 201 yet. Today, a computing device de-duplicates the data it needs to upload with itself (i.e. has it ever seen this data before) and then asks the application server 201 if it has ever seen any of the data it intends to upload before, thereby ensuring that only unique data travels over the network. The teachings of the present document add a de-duplication layer between these by enabling the computing device to first check with itself, then check with the resilient data node 213 to see if any of the data has been seen within that network site 204 before, and only then ask the application server 201.

Figure 3:
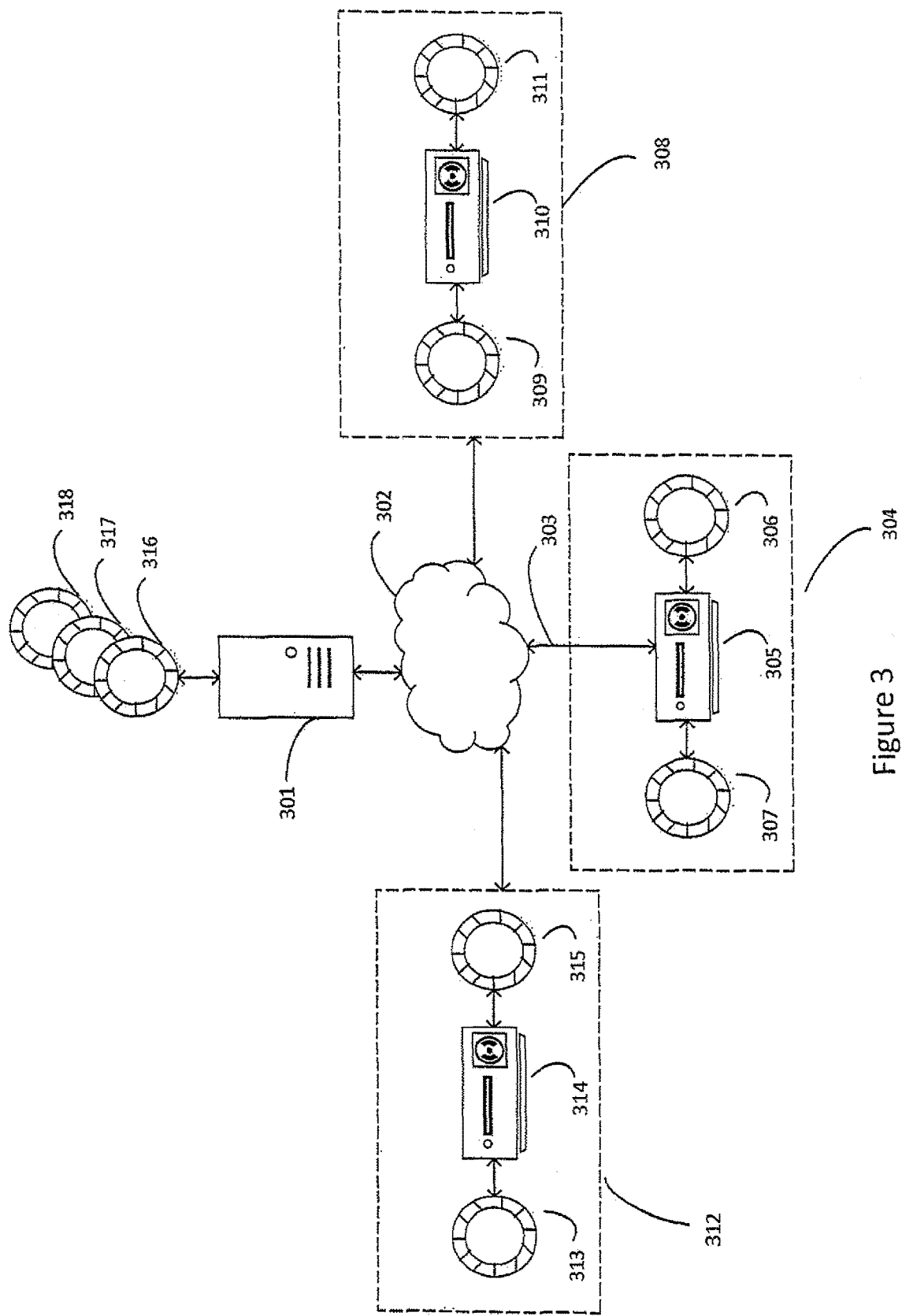
FIG. 3 illustrates multiple network sites each with their own resilient data node and sharing a common WAN to the application server.

Because data could be spread across multiple resilient data nodes before finally making its way to the application server, data may be needed by the application server before it has been uploaded. FIG. 3 illustrates one implementation where there are a number of network sites 304 308 312, each of which have a resilient data node 305 310 314 respectively, servicing LAN attached computing devices. A prioritized queue system is used to control data flow through the system. Each resilient data node maintains multiple queues of data for transport, with each queue assigned a priority for transport. In the illustration in FIG. 3, each resilient data node 305 310 314 is assigned a regular transport queue 307 309 313 respectively, as well as a high priority queue 306 311 315 respectively. Different bandwidth utilization policies can be applied based on the queue priority.

The teachings of the current application support client side data de-duplication at the computing device level, but enhances this to support network site caching of de-duplicated data within a given network site. A computing device at site 312 uploads data to the resilient data node 314 that places the data in the normal queue 313 for eventual upload to the application server 301 according to the bandwidth policy for the site 312. A computing device at site 304 uploads the same data to the resilient data node 305 that places the data in the normal queue 307 for eventual upload to the application server 301 according to the bandwidth policy for site 304. Note that even though the same data has been uploaded to different resilient data nodes, only one copy of the data will actual be uploaded from either queue 313 or 307. Before data is uploaded from the queues, the application server 301 will inform the resilient data node 305 that another resilient data node 314 has already uploaded the data and so don't bother uploading it again. This continues to deliver the data de-duplication efficiency of the existing solution by only moving the data once over the any low speed bandwidth connection, while delivering rapid data availability by caching the data on the LAN.

The system itself is multi-tenant, and the data can be deduplicated across multiple tenants that in turn use resilient data nodes. The deduplication performed at the resilient data node level is scoped to the tenant level to make sure that if another tenants resilient data node hold the original data and it never makes it to the application server 301 that the tenant it protected. In other words, the system is resilient against the failure of other tenants in a multi-tenanted solution.

The teachings of the current application support just-in-time access to data when needed, even if that data has not made it to the application server 301 yet. A computing device at networking site 308 can make a request for data to the resilient data node 310 (rather than going direct to the application server 301 if a resilient data node was not available). The resilient data node 310 will provide the elements of the data requested from its local cache. Any data that is needed that does not exist in its local cache is requested from the application server 301. The application server 301 will immediately begin providing the data that has already been uploaded to it, but some of the data needed may still be in a queue on one of the resilient data nodes 305 in one of the other network sites 304 to move the data needed from the normal priority queue 307, into a higher priority queue 306. The data is now be uploaded according to the high priority bandwidth policy in order to fulfil the original request from the resilient data node 310. Once the data is downloaded to the resilient data node 310, it is provided to the original computing device that requested it.

The computing device does not need to remain connected to the resilient data node 310 until the data is downloaded. It can disconnect from the network and the resilient data node 310 can continue to retrieve the needed data so that it is available the next time the computing device connects.

A second implementation is also shown in FIG. 3, where instead of queues existing on the resilient data nodes 305 310 314, there is instead a single prioritized queue for each resilient data node 305 310 314 maintained on the application server 301, being 316 317 318 respectively. The resilient data nodes become much simpler in this implementation because, instead of having to track state, they simply ask the application server what work should they do now and after that has been performed; they then fetch their next item of work to perform. Not having state maintained on the resilient data node itself makes the system itself more resilient because the exact state of the resilient data node is always known and so the system can recover after a node failure or loss by instructing the computing devices that had data on that resilient data node to send the data that was still pending upload to an alternate resilient data node.

Figure 4:
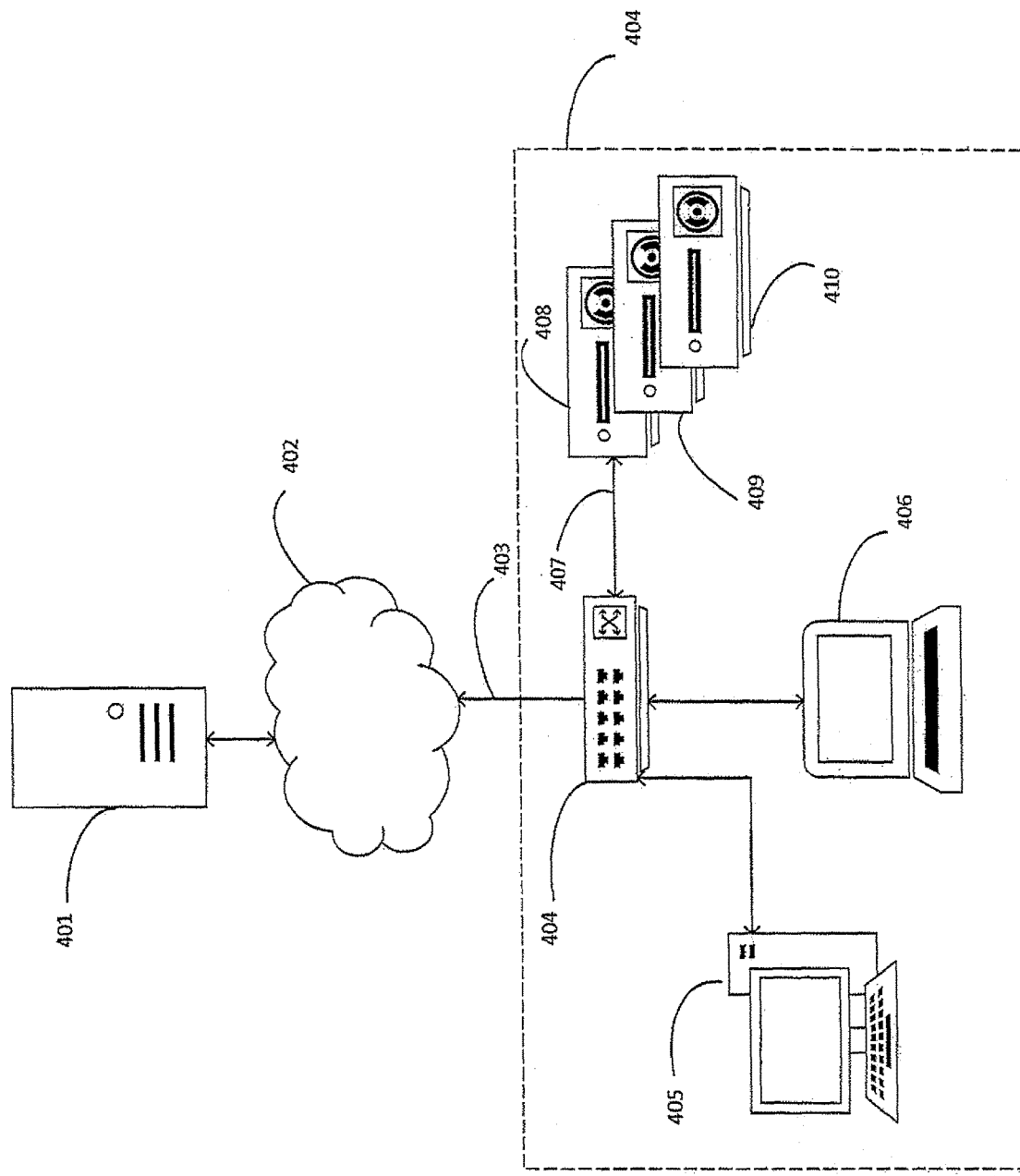
FIG. 4 illustrates a single network site that contains multiple, cooperating resilient data nodes on the high speed LAN for the purposes of data caching and performing time shift bandwidth utilization of the shared WAN connection.

As illustrated in FIG. 4, a larger network site 404 may need multiple resilient data nodes 408 409 410 that provide the services of a single resilient data node in cooperation. A given computing device 405 can be assigned through policy from the application server 401 to always use resilient data node 408 if it can see it on the network. A different computing device 406 may not have an associated default resilient data node on this network site 404. Without a default resilient data node to use on the network site, the computing device 406 is assigned to one of the available resilient data nodes 408 409 410 on the network site 404 based on the best resource utilization across the resilient data nodes.

Figure 5:
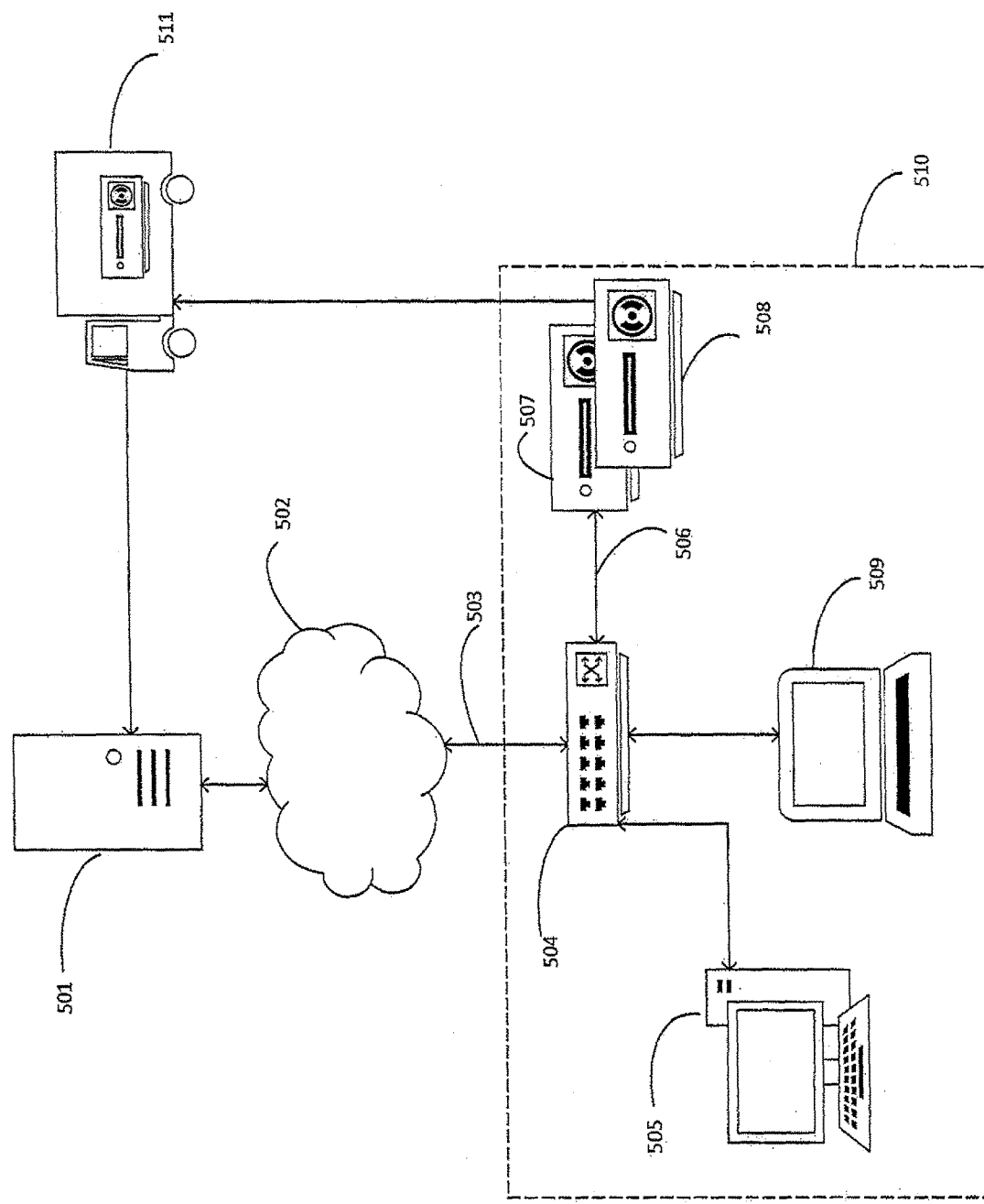
FIG. 5 illustrates how a resilient data node can be utilized at one location and then physically transported to another location.

With the large amount of data being produced and consumed at the edge of the network, it is possible that the low bandwidth network connection will not be able to transport the needed data within a reasonable period of time. One aspect of the teachings of the present document is illustrated in FIG. 5 where resilient data nodes can be physically transported between sites. A new network site 510 is being deployed to utilize the application server 501. Unfortunately this network site 510 only has an extremely low bandwidth connection 503 to the WAN 502. Within the network site 510 itself, there is good internal connectivity via the LAN switch 504. With the number of computing devices at this network site 510, it is just not possible for the data to travel over the low bandwidth connection 503. This may just an initial deployment issue as the incremental data that changes each day may be able to keep up based on the network speed and bandwidth policy assign to the network site 510 (that said, there is no reason that resilient data nodes could not be rotated in and out as needed). Computing devices 505 509 are configured to utilize a temporary resilient data node 508 in additional to a permanent resilient data node 507 to initially upload their data to. Once complete, this resilient data node 508 is disconnected from the network and put in a truck 511 for transport to the physical data center where the application server 501 is located. The resilient data node 508 is connected to the high speed network in the data center and its cached data is uploaded at high speed. The computing devices 505 509 are changed through policy to utilize only a single resilient data node 507 once the resilient data node 508 is disconnected from the network for physical transport. Security and privacy of the data on the resilient data node is not a concern for this kind of transport as each individual piece of data that resides on the resilient data node is encrypted with unique encryption keys for each individual piece of data.

Physically transporting a resilient data node is just one method to help address low bandwidth network connectivity. Other methods include:

Through policy, skip uploading some of the versions of files based on file type, specific computer device or other criteria. An example could be to only transport one version of an end users email archive file at the end of each day.

Add additional criteria to queue prioritization, such as deprioritizing a version of a file if a newer version is added to the queue to make sure you prioritize always getting the latest version to the application server.

Keep blocks on the resilient data node without ever uploading them to the application server so that they are available for local restores, only uploading them should they be requested.

Figure 6:
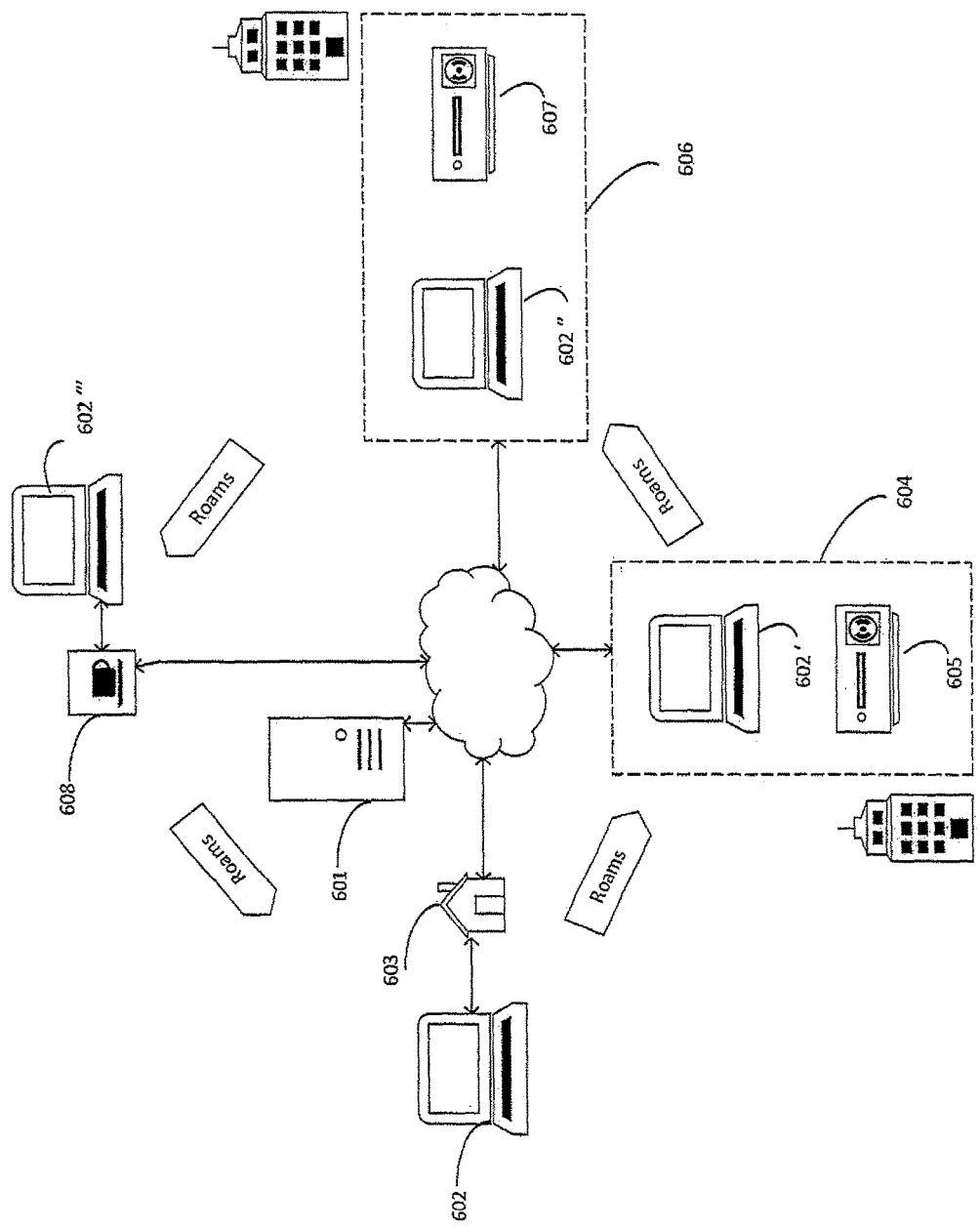
FIG. 6 illustrates the transparent roaming feature of the computing devices; they can dynamically roam between resilient data nodes and the application server without IT or end user intervention.

One implementation of the teachings of the present document is illustrated in FIG. 6, showing a computing device 602 that transparently roams between different private and public networks. The system is resilient to these network transitions for either uploading or downloading of data. For uploading to the application server 601, the computing device 602 uploads directly according to the bandwidth policy for direct network connections. When the user roams to a new network site 604, the computing device 602' at this time detects the resilient data node 605 and begin uploading it data to it rather than directly to the application server 601. When the user roams to a new network site 606, the computing device 602" at this time will detect the resilient data node 607 and begin uploading it data to it rather than to the resilient data node 605 or directly to the application server 601. Before heading home, the computing device 602''' is used from a public hotspot at a local coffee shop. The computing device 602''' detects that there isn't a resilient data node to connect to and so transparently roams to talk directly to the application server 601. These transitions are done transparently to the end user of the computing device.

With uploading data, such resiliency is easier than the downloading of data because the caching facilities of the computing device 602 itself, along with those of resilient data nodes 605 607 when available, are always on the end user side of the low bandwidth connection, transportation of data occurs in the background, and the end user is generally not waiting for the data to upload. With downloading though, it is possible that most of the data needs to cross one or more low bandwidth connections, and the end user could have explicitly triggered the downloading of the data and so is generally watching and waiting for the data to arrive. The teachings of the current application support take a novel approach to addressing this issue and making the system resilient during this scenario also. Using FIG. 6 again, the end user of computing device 602 requests a large restore of data from the application server 601 that may take several days to complete. Rather than an all-at-once approach, the application server will send a number of blocks of data down to the computing device 601 along with a potential back-off request for when the computing device 602 should request the next batch of blocks. This back-off mechanism provides a way to gracefully scale the system when the application server 601 is under load. When the end user roams to network site 604, the computing device 602' at this time will have missed its last batch request for blocks that it made to the application server 601. Now the computing device 602' makes this batch request for blocks to the resilient data node 605, which in turn makes the request to the application server 601 for the blocks it does already have and returns them to the computing device 602' along with a potential back-off request. This back-off request comes from when the resilient data node 605 is under load but also because the application server 601 may have asked the resilient data node 605 to back-off as well. When the end user roams to network site 606 then same process happens again where the computing device 602" will have missed its last batch of blocks and so will start again by asking then resilient data node 607 for that batch. So as the end user roams, the system will continually deliver blocks of data down to the computing device according to bandwidth policy, network constraints and resource availability. On the computing device 602 itself, as enough blocks are available to restore a specific end user data file, then it is restored at that time. So even though the original complete restore of data may take several days, individual files begin to restore almost immediately and continue even between computing device reboots and roaming across different networks.

Other scenarios that can be supported by the teachings of the present document are to support pre-emptive movement of data, the extraction of data for legal hold/e-discovery purposes, as well as on-premise restore for indexing, searching and analytics. An example of pre-emptive data movement is where a computing device that is usually located in one network site is temporarily relocated to a different network site for a short period of time before being relocated back again. Data that is uploaded to the resilient data node at the temporary location eventually makes its way to the application server. However, the system knows that a computing device at the original network site may eventually need the data and so it utilizes available bandwidth to download the data to the cache on the resilient data node of the original network site so that it is available without delay.

For the legal hold/e-discovery scenario, a resilient data node could be populated with the data of the computing devices for the appropriate point in time. This resilient data node could then be physically transported to the lawyers and the data loaded and indexed into their e-discovery software.

With the amount of data within a company it is hard to know what information is available, how it flows through an organization and any number of metrics about that data. Using the teachings of the present document, data could be sent to a resilient data node where it could be restored, indexed and made available through a search interface. Analytics could also ingest the data to be able to slice and dice the data for informational and trending analysis.

The invention claimed is:

1. A system that performs data backup, data archiving, data synching, and data sharing, the system comprising:
   an application server that provides a set of network-based application services for data backup, data archiving, data synchronization, and data sharing;
   a wide-area network; and
   a remote branch office site comprising:
      a high-speed local area network switch that connects, via a low bandwidth network connection, to the wide-area network through a connection that has a slower data-transfer speed than provided by a local area network within the local area network switch,
      one or more computing devices, each connected to the local area network within the high-speed local area network switch, that include agents and that consume one or more network-based application services of the set of network-based application services exposed by the application server, and
      a resilient data node, connected to the high-speed local area network switch, that:
         exposes data backup, data archiving, data synching, and data sharing functionality over a Web Service-based interface to the one or more computing devices,
         provides a high-speed data cache on the local area network within the high-speed local area network switch for data that needs to be sent to, or be received from, the application server, and
         by providing for client-side data de-duplication, identifies unique data for transmission to the application server.

2. The system of claim 1, wherein the system includes an interface that provides management of the resilient data node, including:
   display of current connection and network speeds and queue lengths;
   generation of alerts for levels of disk space, queue length, and queue age;
   setting bandwidth policy and connection and network speeds for specified time periods; and
   changing resilient-data-node operational status, including online/offline status.

3. The system of claim 1, wherein a centralized policy applied to the high-speed local area network switch specifies aggregate connection bandwidth between the high-speed local area network switch and the network for specified time periods.

4. The system of claim 1, wherein data flagged to be unique and to be uploaded to the application server are sent via network-based application service protocols to the resilient data node for later transport to the application server.

5. The system of claim 1, wherein the resilient data node locally de-duplicates data received from computing devices for transport to the application server.

6. The system of claim 1, wherein, when requested to return data by a computing device, the resilient data node returns data locally stored and managed by the resilient data node, the resilient data node only forwarding a request for data on to the application server when the resilient data node cannot provide the requested data from data locally stored and managed by the resilient data node.

7. The system of claim 1, wherein a computing device requests data from the resilient data node, after which the computing device disconnects from the high-speed local area network switch and later reconnects to the high-speed local area network switch to receive the requested data from the resilient data node.

8. The system of claim 1, wherein a resilient data node is physically transported from a second remote branch office and installed within the remote branch office in order to provide data to the computing devices.

* * * * *